US008577536B2

(12) United States Patent
Lee et al.

(10) Patent No.: US 8,577,536 B2
(45) Date of Patent: Nov. 5, 2013

(54) ELECTRONIC DEVICE AND EXHIBITION GUIDE METHOD FOR SAME

(75) Inventors: Hou-Hsien Lee, New Taipei (TW);
Chang-Jung Lee, New Taipei (TW);
Chih-Ping Lo, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 107 days.

(21) Appl. No.: 13/220,717

(22) Filed: Aug. 30, 2011

(65) Prior Publication Data

US 2012/0173451 A1 Jul. 5, 2012

(30) Foreign Application Priority Data

Dec. 29, 2010 (TW) ................................ 99146728 A (51) Int. Cl.
*G01C 22/00* (2006.01)
*G01C 9/00* (2006.01)
*G06F 15/16* (2006.01)

(52) U.S. Cl.
USPC .............................. 701/23; 709/217; 702/153

(58) Field of Classification Search
USPC .......................................................... 701/23
See application file for complete search history.

(56) References Cited

U.S. PATENT DOCUMENTS

| 6,975,959 B2 * | 12/2005 | Dietrich et al. ............... 702/153 |
| 8,229,160 B2 * | 7/2012 | Rosenblatt .................... 382/100 |
| 2009/0113305 A1 * | 4/2009 | Graif et al. .................... 715/727 |

* cited by examiner

*Primary Examiner* — Thomas Black
*Assistant Examiner* — Tyler Paige
(74) *Attorney, Agent, or Firm* — Altis & Wispro Law Group, Inc.

(57) ABSTRACT

A method provides an exhibition guide using an electronic device. The method obtains exhibit information of a plurality of exhibits in a preselected exhibition from a remote computer, obtains location coordinates of the electronic device, calculates a distance between each exhibit and the electronic device, and determines one or more exhibits which are adjacent to the electronic device. The method further obtains an indicating direction of the electronic device, compares the indicating direction of the electronic device with a display direction of each adjacent exhibit to obtain a matched exhibit, and plays commentary of the matched exhibit on the electronic device.

19 Claims, 12 Drawing Sheets

| SN | Name | Author | Location coordinates | Display direction |
|---|---|---|---|---|
| 1 | Exhibit 1 | Picasso | ("150.1825,"11.8541) | N-E15° |
| 2 | Exhibit 2 | Van Gogh | ("151.5874,"10.5852) | S-W20° |
| 3 | Exhibit 3 | Van Gogh | ("151.6487,"10.6889) | S-W20° |
| 4 | Exhibit 4 | Van Gogh | ("151.9858,"10.9854) | E-S25° |
| ... | ... | Van Gogh | | ... |

FIG. 5

Exhibit 6:
N-W15°

Exhibit 7:
N-E15°

Exhibit 8:
E-S10°

ELECTRONIC DEVICE AND EXHIBITION GUIDE METHOD FOR SAME

BACKGROUND

1. Technical Field

Embodiments of the present disclosure relate to an electronic device and a method providing an exhibition guide.

2. Description of Related Art

When viewing works or articles on exhibition in art galleries, museums, exhibitions, and fairs, users may carry and read brochures or catalogs containing information on the works exhibited. In some cases, users are directly guided by a human guide or a speech ciphering equipment at the exhibition. However, this method is inconvenient because the users have to visit the art gallery or exhibition at a specific time to acquire the necessary information. Further, the users who are distant from the guide may have difficulty hearing when a lots of tourists are present at the exhibition, and the user may not rent the speech ciphering equipment because the quantity of the speech ciphering equipment is limited. Therefore, an efficient method of providing an exhibition guide is desired.

DETAILED DESCRIPTION

All of the processes described below may be embodied in, and fully automated via, functional code modules executed by one or more general purpose electronic devices or processors. The code modules may be stored in any type of non-transitory readable medium or other storage device. Some or all of the methods may alternatively be embodied in specialized hardware. Depending on the embodiment, the non-transitory readable medium may be a hard disk drive, a compact disc, a digital video disc, a tape drive or other suitable storage medium.

Figure 1:
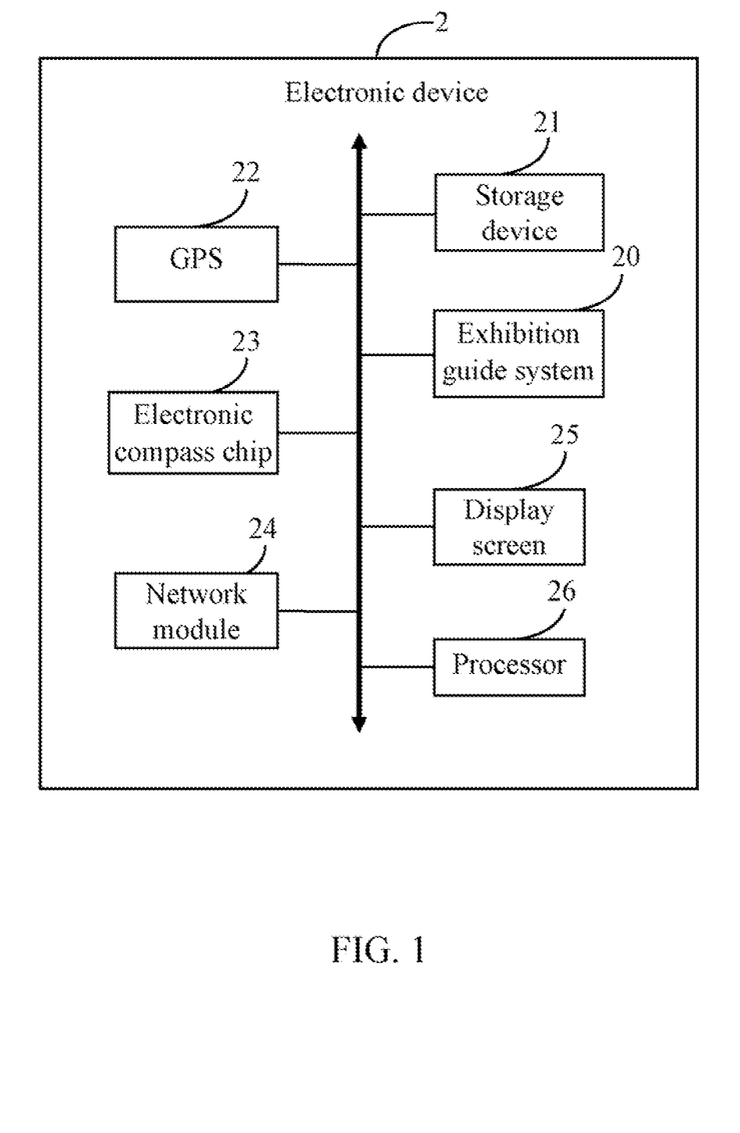
FIG. 1 is a block diagram of one embodiment of an electronic device including an exhibition guide system.

FIG. 1 is a block diagram of one embodiment of an electronic device 2 including an exhibition guide system 20. In one embodiment, the electronic device 2 further includes a storage device 21, a global positioning system (GPS) 22, an electronic compass chip 23, a network module 24, a display screen 25, and at least one processor 26. The exhibition guide system 20 may be used to detect coordinates and an indicating direction of the electronic device 2, select a matched exhibit adjacent to the electronic device 2 according to the coordinates and the indicating direction of the electronic device 2, and play corresponding commentary of the matched exhibit on the display screen 25. A detailed description will be given in the following paragraphs.

In one embodiment, the GPS 22 is used to detect the present coordinates of the location of the electronic device 2. The electronic compass chip 23 is used to detect the movement and orientation of the electronic device 2 when it is moved. The network module 24 is used to connect the electronic device 2 with a remote computer through a cable network or a wireless network, such as a GPRS, WIFI/WLAN, and 3G/WCDMA system.

The display screen 25 may be a liquid crystal display (LCD) or a touch-sensitive display, for example. The electronic device 2 may be a mobile phone, a personal digital assistant (PDA) or any other suitable communication device.

Figure 2:
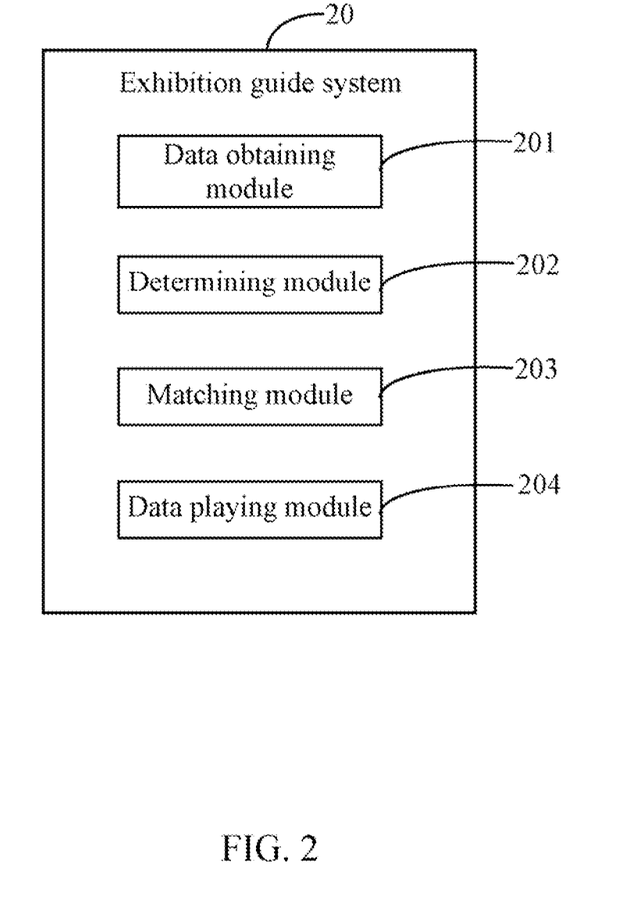
FIG. 2 is a block diagram of one embodiment of the exhibition guide system included in the electronic device of FIG. 1.

FIG. 2 is a block diagram of one embodiment of the exhibition guide system 20 in the electronic device 2. In one embodiment, the exhibition guide system 20 may include one or more modules, for example, a data obtaining module 201, a determining module 202, a matching module 203, and a data playing module 204. In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives. The one or more modules 201-204 may comprise computerized code in the form of one or more programs that are stored in the storage device 21 or memory of the electronic device 2. The computerized code includes instructions that are executed by the at least one processor 26 to provide functions for the one or more modules 201-204.

Figure 3:
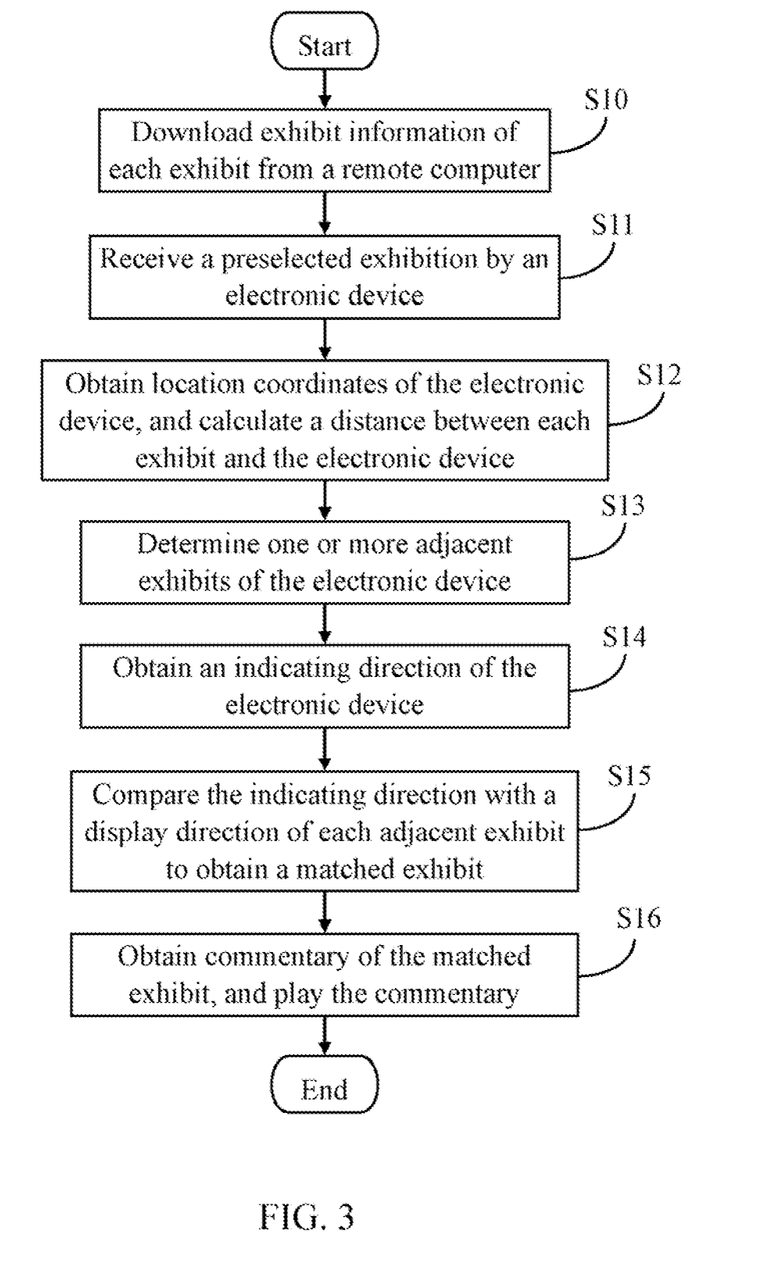
FIG. 3 is a flowchart of one embodiment of a method for providing an exhibition guide using the electronic device in FIG. 1.

FIG. 3 is a flowchart of one embodiment of a method for providing an exhibition guide using the electronic device 2 in FIG. 1. Depending on the embodiment, additional blocks may be added, others removed, and the ordering of the blocks may be changed.

Figure 4A:
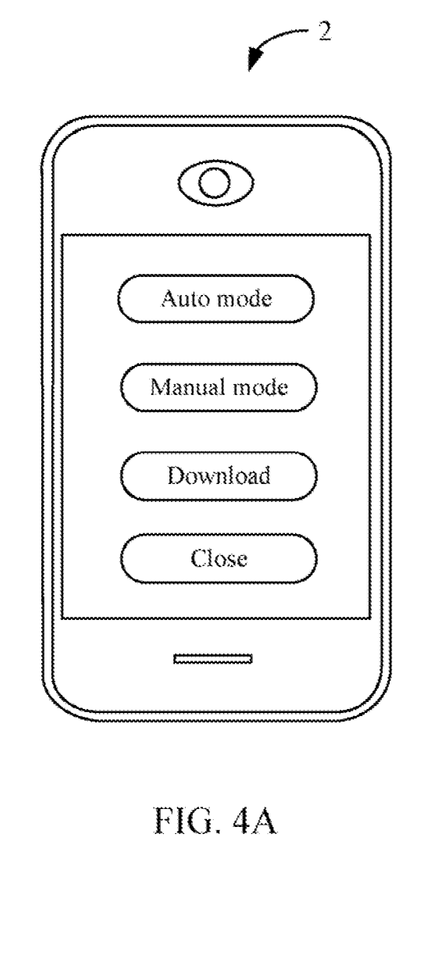
FIGS. 4A-4C are schematic diagrams of one embodiment of an operation interface of the electronic device in FIG. 1.
Figure 4B:
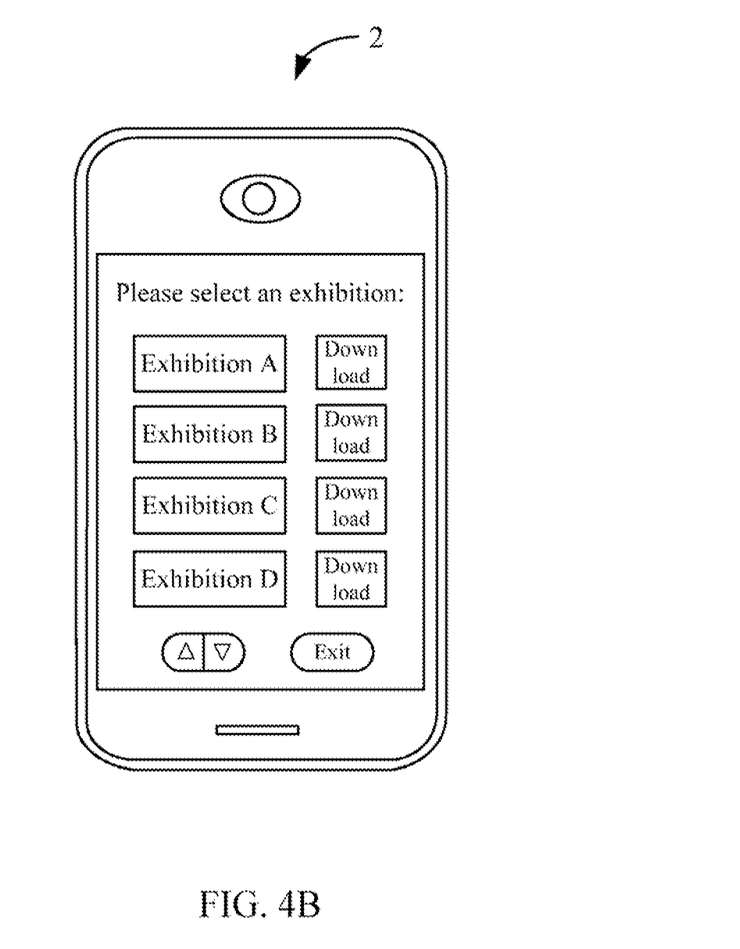
Figure 4C:
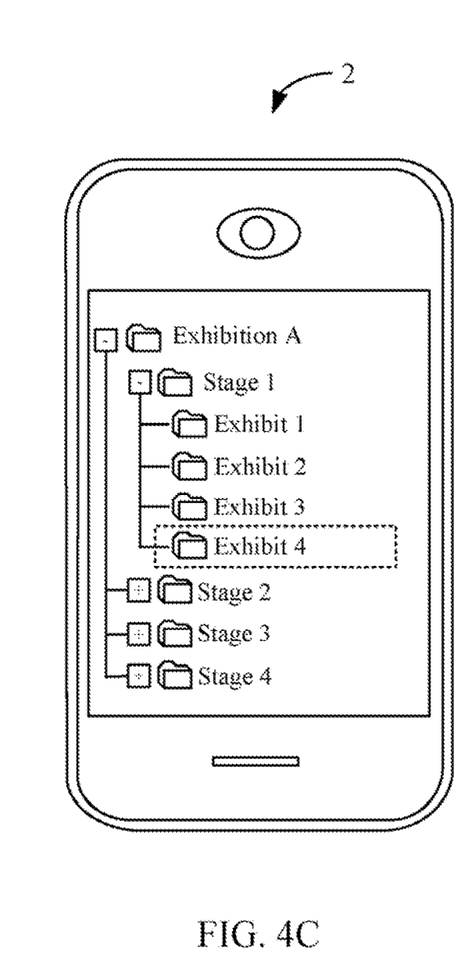

In block S10, the data obtaining module 201 downloads exhibit information and a commentary in relation to each exhibit of a plurality of exhibitions from the remote computer, and stores the downloaded data in the storage device 21. In one embodiment, the whole show is called "the exhibition," such as the History of China Exhibition at Beijing, and each display or stand is called "an exhibit," such as the Great Wall exhibit. Refer to FIG. 4A, a user logs in to the exhibition guide system 20 through the electronic device 2, and selects the "Download" button to enter a download interface (see FIG. 4B). The user further selects an exhibition (e.g., an exhibition A) to download the exhibit(s) information and the commentary of the exhibit(s) of the selected exhibition from the remote computer. If the user selects a manual mode in FIG. 4A, the exhibit (e.g., an exhibit 4) must be selected manually in FIG. 4C.

Figure 5:
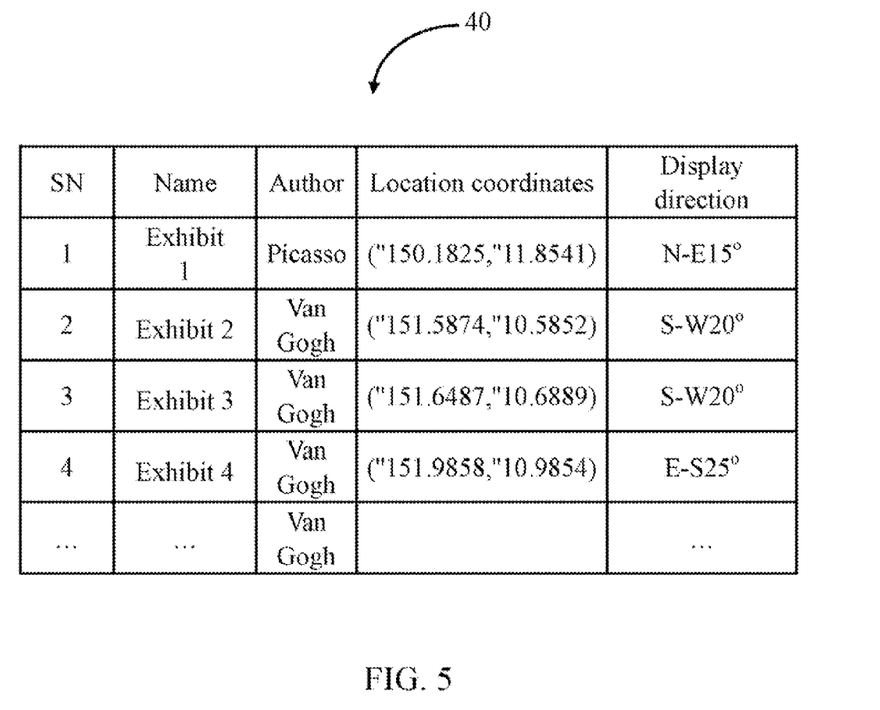
FIG. 5 is a schematic diagram of one embodiment of exhibit information stored in a database.
Figure 6:
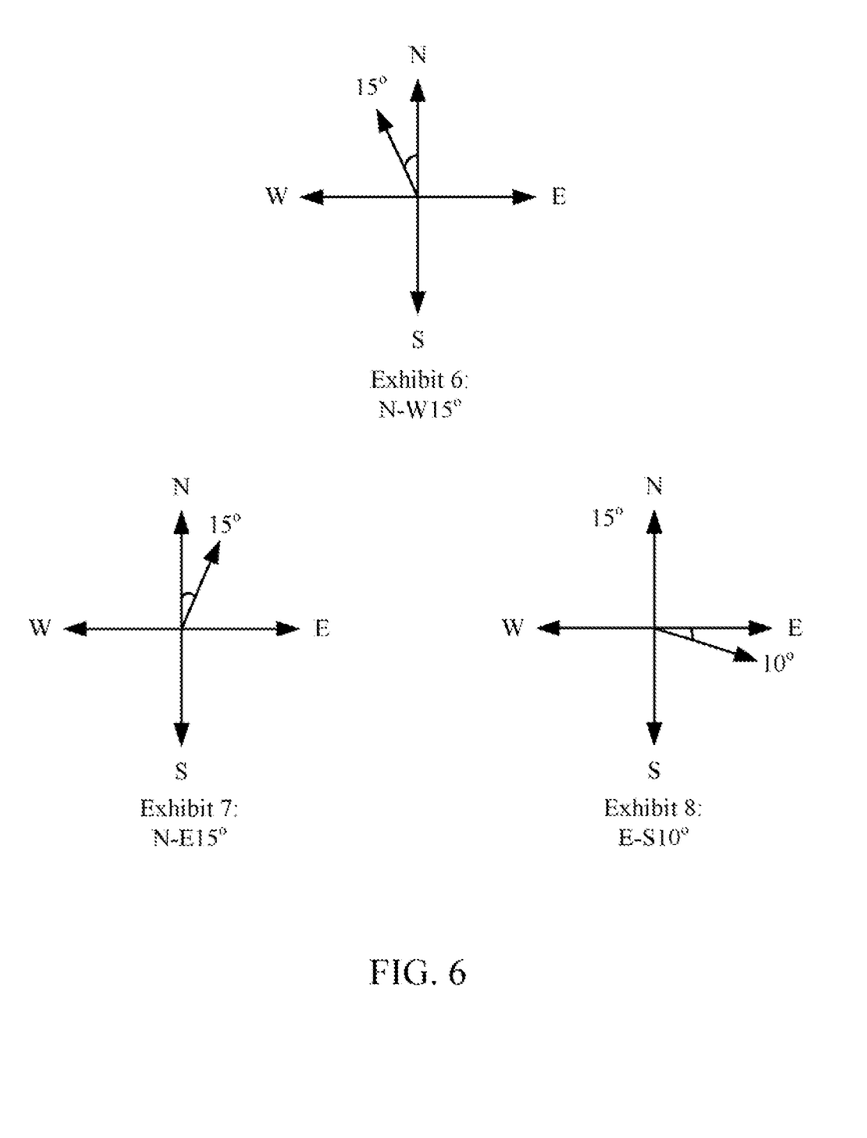
FIG. 6 are exemplary schematic diagrams of display directions of a plurality of exhibits.

As shown in FIG. 5, in one embodiment, the exhibit information may include, but is not limited to, a serial number (SN), a name, an author, the location coordinates, and a display direction of each exhibit in relation to the electronic device 2. The exhibit information stores in a database 40 of the remote computer. In one embodiment, the display direction of the exhibit is defined as from the point of view of the exhibit itself instead of from the point of view of the user of the electronic device 2. As shown in FIG. 6, the display direction of the exhibit includes a reference direction, a deflecting direction, and a deflecting angle of the exhibit. For example, the display direction of the exhibit 6 in FIG. 6 is "N-W15°", where the first letter "N" (north) represents the reference direction of the exhibit 6, the second letter "W" (west) represents the deflecting direction corresponding to the reference direction of the exhibit 6, and the third digit "15" represents a value of the deflecting angle corresponding to the reference direction of the exhibit 6.

In block S11, the data obtaining module 201 receives a preselected exhibition when the user selects auto mode in FIG. 4A.

In block S12, the determining module 202 obtains the location coordinates of the electronic device 2 as detected by the GPS 22 of the electronic device 2, and calculates a distance between each exhibit and the electronic device 2 according to the location coordinates of the electronic device 2 and the location coordinates of each exhibit. As mentioned above, the location coordinates of each exhibit are stored on the remote computer.

Figure 7:
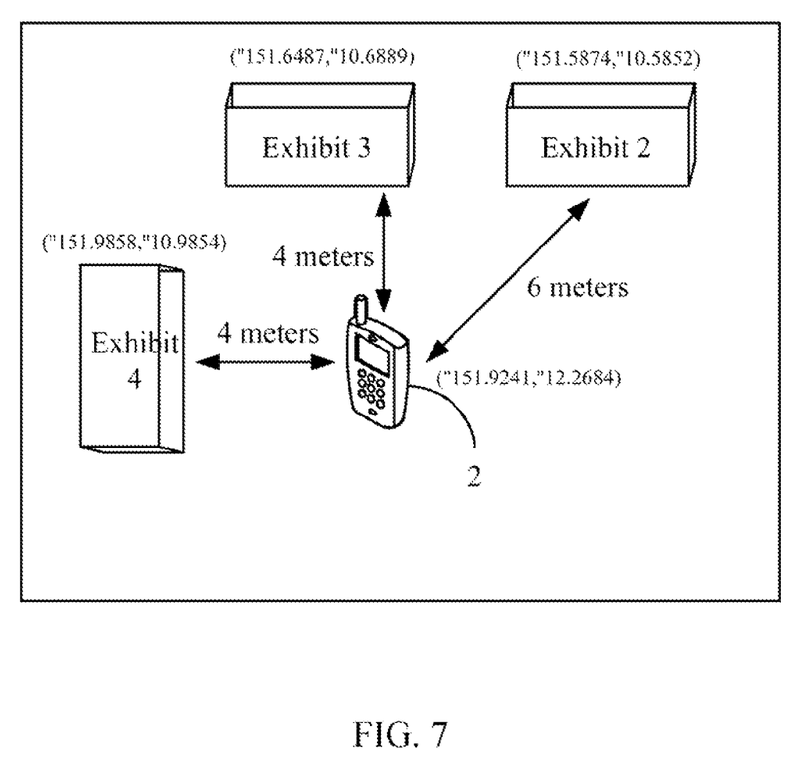
FIG. 7 is an exemplary schematic diagram of one or more adjacent exhibits in relation to the electronic device.

In block S13, the determining module 202 determines the placement of one or more adjacent exhibits in relation to the electronic device 2. In one embodiment, the distance between each adjacent exhibit and the electronic device 2 is less than or equal to a preset value (e.g., 6 meters). For example, as shown in FIG. 7, the exhibits which are adjacent to the electronic device 2 are exhibit 2, exhibit 3, and exhibit 4.

In block S14, the matching module 203 obtains the indicating direction of the electronic device 2 as detected by the electronic compass chip 3 when the electronic device 2 is moved.

In one embodiment, similar to the display direction of the exhibit, the indicating direction of the electronic device 2 may include a reference direction, a deflecting direction, and a deflecting angle of the electronic device 2. For example, suppose that the indicating direction of the electronic device 2 is "N-E20°", where the first letter "N" (north) represents the reference direction of the electronic device 2, the second letter "E" (east) represents the deflecting direction corresponding to the reference direction of the electronic device 2, and the third digit "20" represents a value of the deflecting angle to be superimposed on the basic compass bearing to give the direction of the electronic device 2.

In block S15, the matching module 203 compares the indicating direction of the electronic device 2 with the display direction of each adjacent exhibit to obtain a matched exhibit. A detailed description is as follows.

Figure 8:
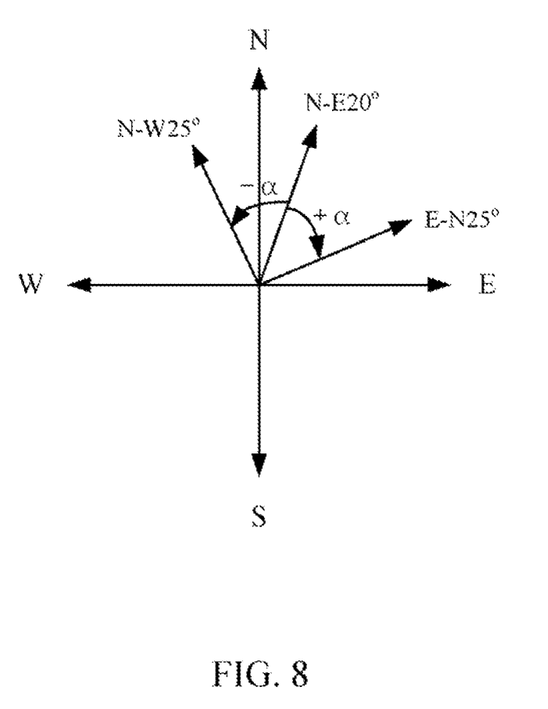
FIG. 8 is an exemplary schematic diagram of a deflection range of an indicating direction of the electronic device.

The matching module 203 determines a deflection range of the indicating direction of the electronic device 2 by expanding the indicating direction of the electronic device 2 with a preset angle (e.g., forty five degrees). For example, as shown in FIG. 8, suppose that the indicating direction of the electronic device 2 is "N-E20°", "α" represent the preset angle, thus, the deflection range of the indicating direction of the electronic device 2 is [N-W25°, E-N25°].

In one embodiment, if the display direction of the exhibit is defined as from the point of view of the exhibit itself instead of from the point of view of the user of the electronic device 2, the matching module 203 determines one particular exhibit as the matched exhibit upon the condition that the reference direction of the exhibit is opposite to the reference direction of electronic device 2, and both of the deflecting direction and the deflecting angle of the exhibit fall in the deflection range.

In other embodiments, if the display direction of the exhibit is defined as from the point of view of the user of the electronic device 2, the matching module 203 determines one particular exhibit as the matched exhibit upon the condition that the reference direction of the exhibit is identical to the reference direction of electronic device 2, and both of the deflecting direction and the deflecting angle of the exhibit fall in the deflection range.

Figure 9:
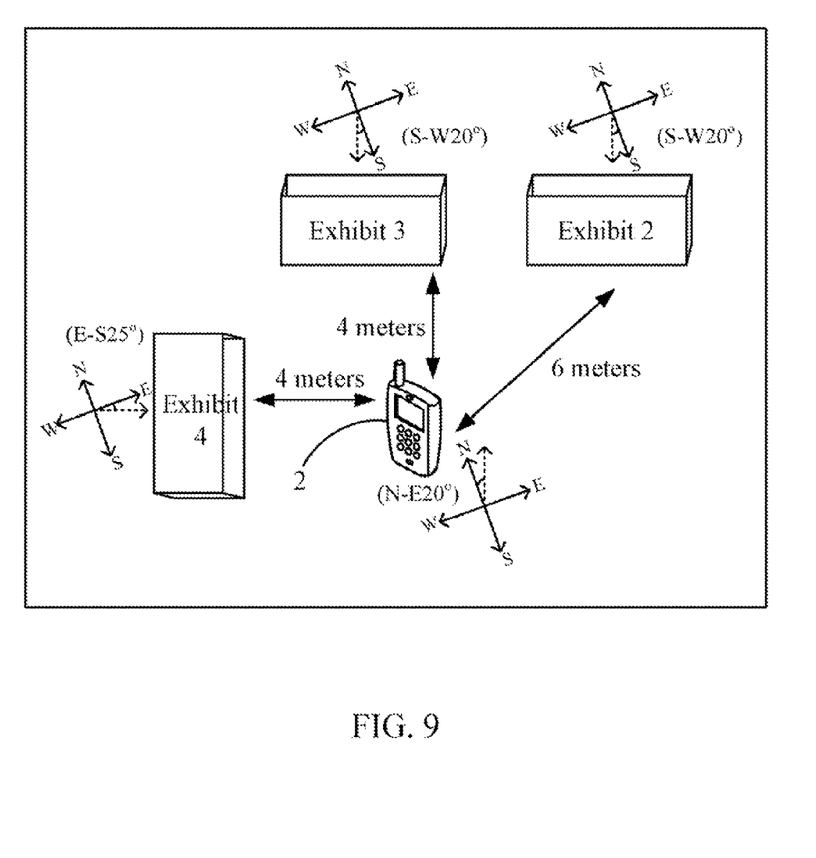
FIG. 9 and FIG. 10 are exemplary schematic diagrams of determining a matched exhibit in relation to the electronic device.
Figure 10:
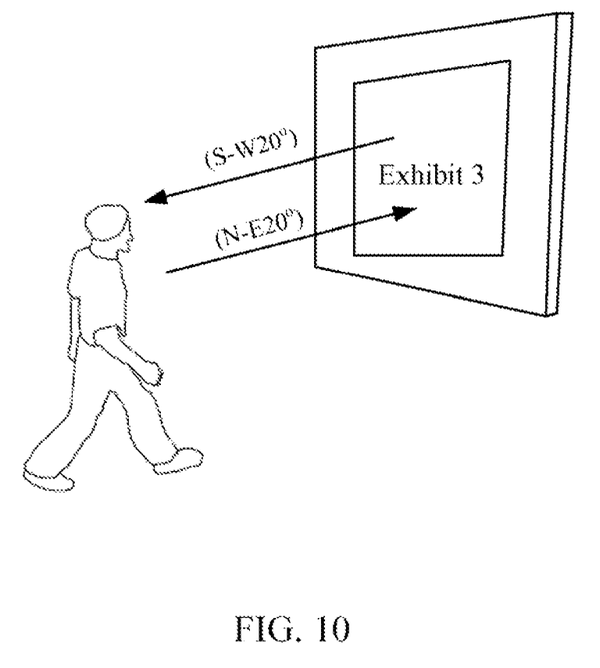

If more than two matched exhibits have been found, the matching module 203 selects the exhibit nearest to the electronic device 2 as the matched exhibit. For example, as shown in FIG. 9, exhibit 2 and exhibit 3 are both matched exhibits which are adjacent to the electronic device 2. However, the distance from exhibit 3 to the electronic device 2 (i.e., 4 meters) is less than the distance from exhibit 2 to the electronic device 2 (i.e., 6 meters). Thus, the exhibit 3 is finally selected as the matched exhibit, as shown in FIG. 10.

In block S16, the data playing module 204 obtains the commentary of the matched exhibit from the storage device 21, and plays and/or displays the commentary on the media player of the display screen 25 of the electronic device 2.

It should be emphasized that the above-described embodiments of the present disclosure, or any particular embodiment, are merely possible examples of implementations, set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and the present disclosure is protected by the following claims.

What is claimed is:

1. A method for providing an exhibition guide using an electronic device, the method comprising:
   obtaining exhibit information of a plurality of exhibits in a preselected exhibition from a storage device of the electronic device;
   obtaining location coordinates of the electronic device detected by a global position system (GPS) of the electronic device, and calculating a distance between each exhibit and the electronic device according to the location coordinates of the electronic device and preset location coordinates of each exhibit;
   determining one or more adjacent exhibits of the electronic device, wherein a distance between each of the adjacent exhibits and the electronic device is less than or equal to a preset value;
   obtaining an indicating direction of the electronic device detected by an electronic compass chip of the electronic device;
   comparing the indicating direction of the electronic device with a display direction of each adjacent exhibit to obtain a matched exhibit; and
   obtaining commentary of the matched exhibit from the storage device, and playing the commentary on a display screen of the electronic device.

2. The method according to claim 1, further comprising: obtaining a reference direction of the electronic device, a deflecting direction of the electronic device, and a deflecting angle of the electronic device, and obtaining a reference direction of the exhibit, a deflecting direction of the exhibit, and a deflecting angle of the exhibit.

3. The method according to claim 2, wherein the matched exhibit is obtained by:
   determining a deflection range of the indicating direction of the electronic device by expanding the indicating direction of the electronic device with a preset angle;
   determining an exhibit as the matched exhibit upon the condition that the reference direction of the exhibit is opposite to the reference direction of electronic device, and both of the deflecting direction and the deflecting angle of the exhibit fall in the deflection range of the indicating direction of the electronic device;

selecting an exhibit nearest to the electronic device as the matched exhibit upon the condition that more than two matched exhibits haven been found.

4. The method according to claim 3, wherein the step of expanding the indicating direction of the electronic device with a preset angle comprise: expanding the indicating direction of the electronic device with 45 degrees.

5. The method according to claim 2, wherein the matched exhibit is obtained by:

determining a deflection range of the indicating direction of the electronic device by expanding the indicating direction of the electronic device with a preset angle;

determining an exhibit as the matched exhibit upon the condition that the reference direction of the exhibit is identical to the reference direction of electronic device, and both of the deflecting direction and the deflecting angle of the exhibit fall in the deflection range of the indicating direction of the electronic device;

selecting an exhibit nearest to the electronic device as the matched exhibit upon the condition that more than two matched exhibits haven been found.

6. The method according to claim 1, further comprising:

downloading the exhibit information and the commentary of each exhibit in a plurality of exhibitions from a remote computer; and storing the downloaded data in the storage device of the electronic device.

7. An electronic device, comprising:

a display screen;

a storage device;

an electronic compass chip;

at least one processor; and one or more modules that are stored in the storage device and are executed by the at least one processor, the one or more modules comprising instructions:

to obtain exhibit information of a plurality of exhibits in a preselected exhibition from the storage device;

to obtain location coordinates of the electronic device detected by a global position system (GPS) of the electronic device, and calculate a distance between each exhibit and the electronic device according to the location coordinates of the electronic device and preset location coordinates of each exhibit;

to determine one or more adjacent exhibits of the electronic device, wherein a distance between each of the adjacent exhibits and the electronic device is less than or equal to a preset value;

to obtain an indicating direction of the electronic device detected by the electronic compass chip;

to compare the indicating direction of the electronic device with a display direction of each adjacent exhibit to obtain a matched exhibit; and to obtain commentary of the matched exhibit from the storage device, and play the commentary on the display screen.

8. The electronic device according to claim 7, wherein the indicating direction of the electronic device comprise a reference direction of the electronic device, a deflecting direction of the electronic device, and a deflecting angle of the electronic device, and the display direction of the exhibit comprise a reference direction of the exhibit, a deflecting direction of the exhibit, and a deflecting angle of the exhibit.

9. The electronic device according to claim 8, wherein the matched exhibit is obtained by:

determining a deflection range of the indicating direction of the electronic device by expanding the indicating direction of the electronic device with a preset angle;

determining an exhibit as the matched exhibit upon the condition that the reference direction of the exhibit is opposite to the reference direction of electronic device, and both of the deflecting direction and the deflecting angle of the exhibit fall in the deflection range of the indicating direction of the electronic device;

selecting an exhibit nearest to the electronic device as the matched exhibit upon the condition that more than two matched exhibits haven been found.

10. The electronic device according to claim 9, wherein the preset angle is 45 degrees.

11. The electronic device according to claim 8, wherein the matched exhibit is obtained by:

determining a deflection range of the indicating direction of the electronic device by expanding the indicating direction of the electronic device with a preset angle;

determining an exhibit as the matched exhibit upon the condition that the reference direction of the exhibit is identical to the reference direction of electronic device, and both of the deflecting direction and the deflecting angle of the exhibit fall in the deflection range of the indicating direction of the electronic device; and selecting an exhibit nearest to the electronic device as the matched exhibit upon the condition that more than two matched exhibits haven been found.

12. The electronic device according to claim 7, wherein the one or more modules further comprise instructions: to download the exhibit information and the commentary of each exhibit in a plurality of exhibitions from a remote computer, and to store the downloaded data in the storage device of the electronic device.

13. A non-transitory computer readable medium having stored thereon instructions that, when executed by a processor of an electronic device, causes the electronic device to perform a method for providing an exhibition guide, the method comprising:

obtaining exhibit information of a plurality of exhibits in a preselected exhibition from a storage device of the electronic device;

obtaining location coordinates of the electronic device detected by a global position system (GPS) of the electronic device, and calculating a distance between each exhibit and the electronic device according to the location coordinates of the electronic device and preset location coordinates of each exhibit;

determining one or more adjacent exhibits of the electronic device, wherein a distance between each of the adjacent exhibits and the electronic device is less than or equal to a preset value;

obtaining an indicating direction of the electronic device detected by an electronic compass chip of the electronic device;

comparing the indicating direction of the electronic device with a display direction of each adjacent exhibit to obtain a matched exhibit; and obtaining commentary of the matched exhibit from the storage device, and playing the commentary on a display screen of the electronic device.

14. The non-transitory computer readable medium according to claim 13, wherein the indicating direction of the electronic device comprise a reference direction of the electronic device, a deflecting direction of the electronic device, and a deflecting angle of the electronic device, and the display direction of the exhibit comprise a reference direction of the exhibit, a deflecting direction of the exhibit, and a deflecting angle of the exhibit.

15. The non-transitory computer readable medium according to claim 14, wherein the matched exhibit is obtained by:
   determining a deflection range of the indicating direction of the electronic device by expanding the indicating direction of the electronic device with a preset angle;
   determining an exhibit as the matched exhibit upon the condition that the reference direction of the exhibit is opposite to the reference direction of electronic device, and both of the deflecting direction and the deflecting angle of the exhibit fall in the deflection range of the indicating direction of the electronic device;
   selecting an exhibit nearest to the electronic device as the matched exhibit upon the condition that more than two matched exhibits haven been found.

16. The non-transitory computer readable medium according to claim 15, wherein the preset angle is 45 degrees.

17. The non-transitory computer readable medium according to claim 14, wherein the matched exhibit is obtained by:
   determining a deflection range of the indicating direction of the electronic device by expanding the indicating direction of the electronic device with a preset angle;
   determining an exhibit as the matched exhibit upon the condition that the reference direction of the exhibit is identical to the reference direction of electronic device, and both of the deflecting direction and the deflecting angle of the exhibit fall in the deflection range of the indicating direction of the electronic device;
   selecting an exhibit nearest to the electronic device as the matched exhibit upon the condition that more than two matched exhibits haven been found.

18. The non-transitory computer readable medium according to claim 13, wherein the method further comprises:
   downloading the exhibit information and the commentary of each exhibit in a plurality of exhibitions from a remote computer; and
   storing the downloaded data in the storage device of the electronic device.

19. The non-transitory computer readable medium according to claim 13, wherein the medium is selected from the group consisting of a hard disk drive, a compact disc, a digital video disc, and a tape drive.

* * * * *